United States Patent
Kwon

(10) Patent No.: US 11,142,159 B2
(45) Date of Patent: Oct. 12, 2021

(54) COVER APPARATUS OF DRIVER AIRBAG

(71) Applicant: HYUNDAI MOBIS CO., LTD., Seoul (KR)

(72) Inventor: Oh Koang Kwon, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 88 days.

(21) Appl. No.: 16/668,394

(22) Filed: Oct. 30, 2019

(65) Prior Publication Data
US 2020/0148156 A1     May 14, 2020

(30) Foreign Application Priority Data
Nov. 13, 2018    (KR) .................... 10-2018-0138853

(51) Int. Cl.
*B60R 21/2165* (2011.01)
*B60R 21/203* (2006.01)
*B60R 21/215* (2011.01)

(52) U.S. Cl.
CPC ........ *B60R 21/2165* (2013.01); *B60R 21/203* (2013.01); *B60R 21/21656* (2013.01); *B60R 2021/21537* (2013.01)

(58) Field of Classification Search
CPC ............ B60R 21/203; B60R 21/21656; B60R 2021/21537
See application file for complete search history.

(56) References Cited

U.S. PATENT DOCUMENTS

| | | | | |
|---|---|---|---|---|
| 4,903,986 A | * | 2/1990 | Cok | B60R 21/2035 280/728.2 |
| 8,585,078 B1 | * | 11/2013 | Witt, Jr. | B60R 21/207 280/728.3 |
| 9,333,937 B1 | * | 5/2016 | Hock | B60R 21/21656 |
| 10,479,311 B2 | * | 11/2019 | Takebayashi | B60R 21/215 |
| 2006/0022440 A1 | * | 2/2006 | Umehara | B60R 21/2165 280/730.1 |
| 2007/0024034 A1 | * | 2/2007 | Thomas | B60R 21/21656 280/731 |

FOREIGN PATENT DOCUMENTS

| | | | | |
|---|---|---|---|---|
| DE | 10141461 B4 | * | 8/2004 | ......... B60R 21/207 |
| EP | 1112898 A1 | * | 7/2001 | ........ B60R 21/2155 |
| JP | 6660199 B2 | * | 3/2020 | |

* cited by examiner

*Primary Examiner* — Nicole T Verley
(74) *Attorney, Agent, or Firm* — NovoTechIP International PLLC

(57) ABSTRACT

A cover apparatus of a driver airbag may include: a housing disposed in a mounting plate, and having an airbag installed therein; a cover installed over the housing so as to cover the top of the housing; and a tear line tearably formed on the housing such that the cover is opened when the airbag is deployed.

10 Claims, 8 Drawing Sheets

COVER APPARATUS OF DRIVER AIRBAG

CROSS-REFERENCE TO RELATED APPLICATION

The present application claims priority under 35 U.S.C. § 119(a) to Korean Patent Application No. 10-2018-0138853 filed on Nov. 13, 2018 in the Korean Intellectual Property Office, which is incorporated herein by reference in its entirety.

BACKGROUND

1. Technical Field

Embodiments of the present disclosure relate to a cover apparatus of a driver airbag, and more particularly, to a cover apparatus of a driver airbag, which can prevent a sink mark from being formed on a cover, and in which various structures can be installed on the outside of the cover.

2. Related Art

In general, an airbag cover apparatus is installed in a mounting plate of a steering wheel. Inside the airbag cover apparatus, a driver airbag is folded and installed. The driver airbag is deployed to protect a driver, in case of a vehicle collision.

The airbag cover apparatus includes a cover which is installed to cover the top of the mounting plate, and the cover has a tear line which is torn when the driver airbag is deployed. Since the tear line has a smaller thickness than the cover, the tear line is torn when the inflation pressure of the driver airbag is applied to the cover.

In the related art, however, when the thickness of the tear line is smaller than the thickness of the cover, a sink mark may be formed when the airbag cover apparatus is cooled after injection molding, the sink mark indicating that the tear line is sunk. Thus, it may be difficult to manage the quality of the airbag cover apparatus.

Since the cover forming the upper exterior of the steering wheel has the tear line formed thereon, a structure such as a display unit or an illumination emblem, which is installed on the cover, may be damaged when the tear line is torn. Therefore, it may be difficult to install a structure on the cover.

Therefore, there is a need for a device capable of solving the problem.

SUMMARY

Various embodiments are directed to a cover apparatus of a driver airbag, which can prevent a sink mark from being formed on a cover, and in which various structures can be installed on the outside of the cover.

In an embodiment, a cover apparatus of a driver airbag may include: a housing disposed in a mounting plate, and having an airbag installed therein; a cover installed over the housing so as to cover the top of the housing; and a tear line tearably formed on the housing such that the cover is opened when the airbag is deployed.

The tear line may be formed along the outer circumference of the housing.

The tear line may be formed at the top of the housing.

The cover apparatus may further include a hinge protruding outward from the housing, and connected to the housing and the cover such that the cover is rotated when the cover is opened.

The hinge may be formed in parallel to a normal direction of the housing.

The tear line may be formed on the circumference of the housing except a portion where the hinge is formed.

The cover apparatus may further include a tear band disposed on the outer surface of the housing so as to surround the tear line, and having a tear line formation part inserted into the housing.

The tear band may be disposed at the top of the housing so as to support the cover.

The tear line formation part may include a plurality of protrusions arranged along the inner surface of the tear band.

The tear band may include: a round band formed in a round shape to surround the tear line, and having the tear line formation part formed on the inner surface thereof; and a linear band connected to both ends of the round band, and disposed outside the hinge.

In accordance with the embodiment of the disclosure, since the tear line is formed on the housing, it is possible to prevent a sink mark from being formed in the cover when the cover apparatus is cooled after injection molding. Therefore, it may be easy to manage the quality of the cover apparatus.

Since the tear line is formed on the housing, it is possible to prevent the cover from being torn when the airbag is deployed. Therefore, although a structure such as a display unit or an illumination emblem is installed on the cover, it is possible to prevent the structure from being damaged when the cover is opened. Thus, a structure such as a display unit or an illumination emblem may be freely installed on the cover.

Since the tear band is disposed on the outer surface of the housing so as to surround the tear line, the tear line is shielded from outside by the tear band. Therefore, a structure (operating core) inserted into the tear line does not need to be formed in the mold. Thus, the structure of the mold can be simplified to reduce the manufacturing cost.

DETAILED DESCRIPTION

Hereinafter, a cover apparatus of a driver airbag will be described below with reference to the accompanying drawings through various examples of embodiments. It should be noted that the drawings are not to precise scale and may be exaggerated in thickness of lines or sizes of components for descriptive convenience and clarity only. Furthermore, the terms as used herein are defined by taking functions of the disclosure into account and can be changed according to the custom or intention of users or operators. Therefore, definition of the terms should be made according to the overall disclosures set forth herein.

First, a cover apparatus of a driver airbag in accordance with a first embodiment of the disclosure will be described.

Figure 1:
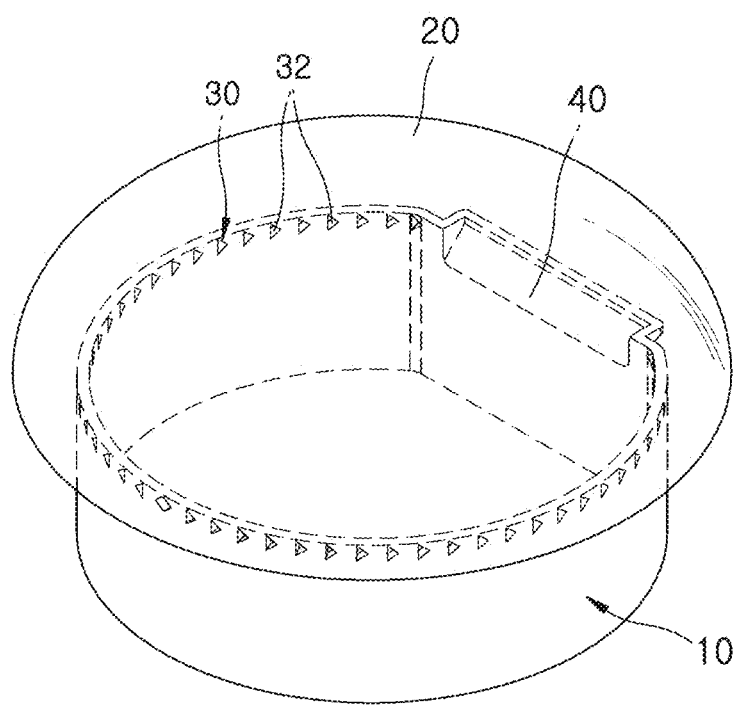
FIG. 1 is a perspective view illustrating a cover apparatus of a driver airbag in accordance with a first embodiment of the disclosure.
Figure 2:
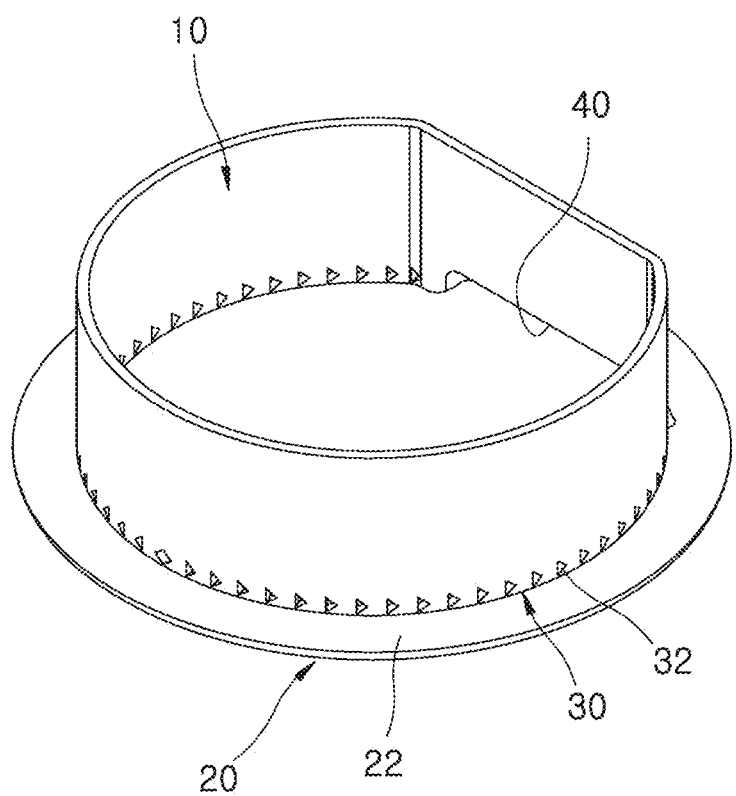
FIG. 2 is a perspective view illustrating the bottom of the cover apparatus of a driver airbag in accordance with the first embodiment of the disclosure.
Figure 3:
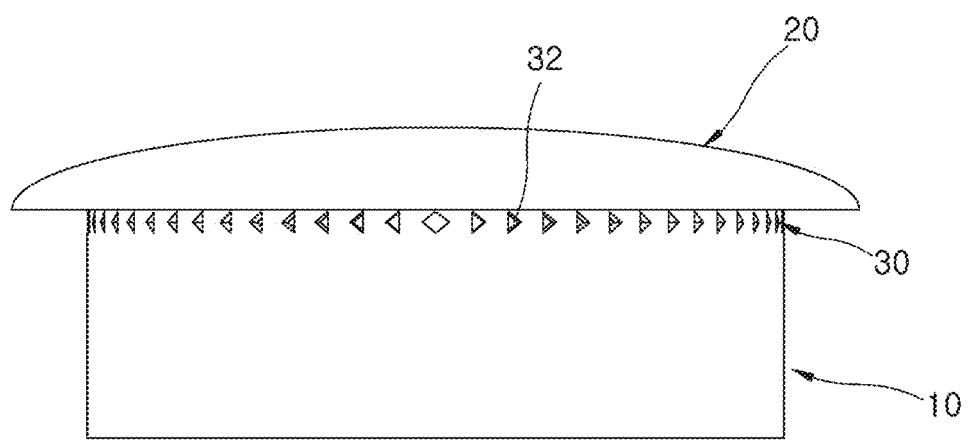
FIG. 3 is a side view illustrating the cover apparatus of a driver airbag in accordance with the first embodiment of the disclosure.
Figure 4:
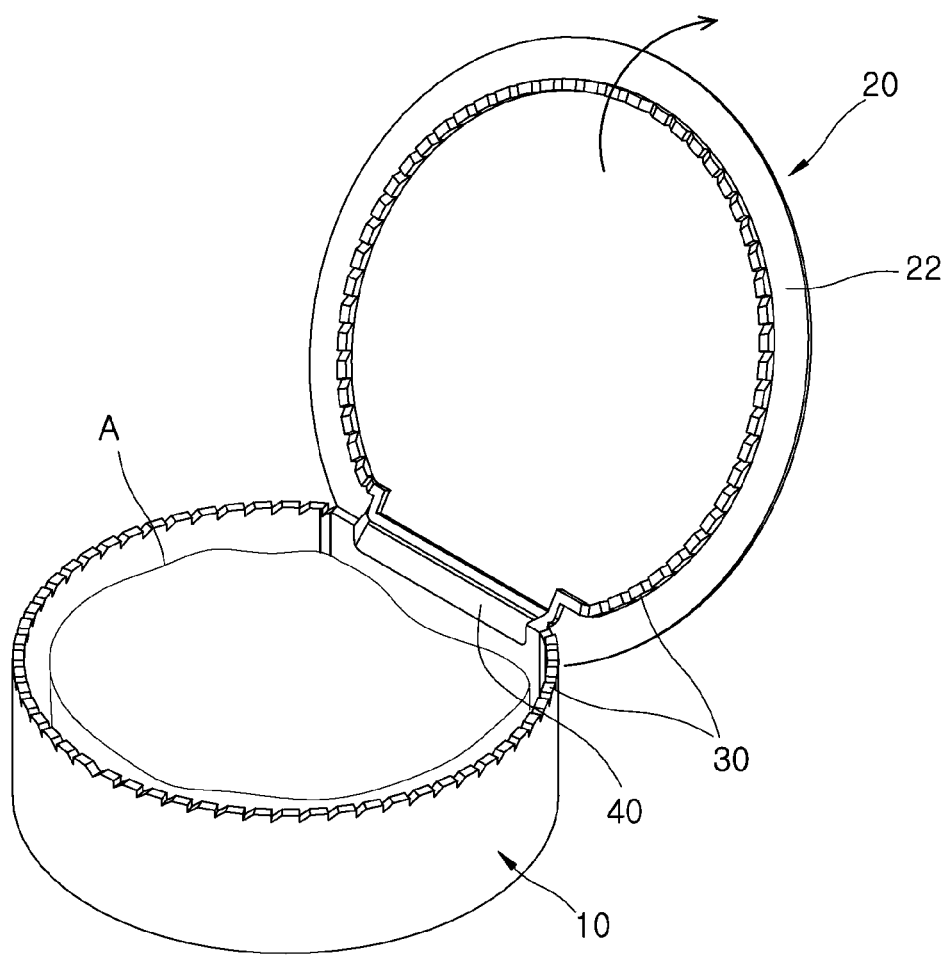
FIG. 4 is a perspective view illustrating that a cover is opened when an airbag is deployed in the cover apparatus of a driver airbag in accordance with the first embodiment of the disclosure.
Figure 5:
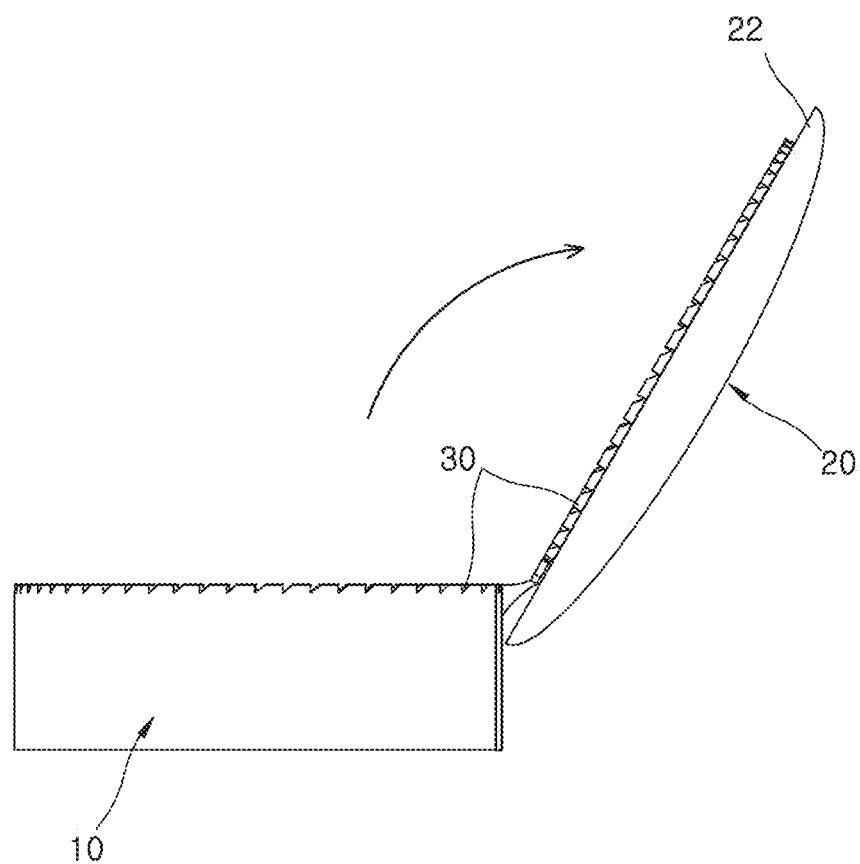
FIG. 5 is a side view illustrating that the cover is opened when the airbag is deployed in the cover apparatus of a driver airbag in accordance with the first embodiment of the disclosure.

FIG. 1 is a perspective view illustrating a cover apparatus of a driver airbag in accordance with a first embodiment of the disclosure, FIG. 2 is a perspective view illustrating the bottom of the cover apparatus of a driver airbag in accordance with the first embodiment of the disclosure, FIG. 3 is a side view illustrating the cover apparatus of a driver airbag in accordance with the first embodiment of the disclosure, FIG. 4 is a perspective view illustrating that a cover is opened when an airbag is deployed in the cover apparatus of a driver airbag in accordance with the first embodiment of the disclosure, and FIG. 5 is a side view illustrating that the cover is opened when the airbag is deployed in the cover apparatus of a driver airbag in accordance with the first embodiment of the disclosure.

Referring to FIGS. 1 to 5, the cover apparatus of a driver airbag in accordance with the first embodiment of the disclosure may include a housing 10, a cover 20 and a tear line 30.

The housing 10 is disposed in a mounting plate (not illustrated), and has an airbag (e.g., airbag A shown in FIG. 4) installed therein. The mounting plate is disposed in a steering wheel (not illustrated). The airbag is folded or packaged in the housing 10. The housing 10 may be formed in a container shape to surround the inner surface of the mounting plate. The housing 10 is installed through a hook (not illustrated) so as not to be separated from the mounting plate.

The cover 20 is installed over the housing 10 so as to cover the top of the housing 10. The cover 20 forms the top exterior of a steering wheel. The cover 20 has a flange 22 formed along the circumference of the housing 10 and protruding outward from the housing 10. The flange 22 serves to prevent the housing 10 from being exposed to the outside. The cover 20 may be formed in a disk shape.

The tear line 30 is tearably formed on the housing 10 such that the cover 20 is opened by an expansion force of the airbag when the airbag is deployed. Since the tear line 30 is formed on the housing 10 so as to be covered by the cover 20, the tear line 30 is not seen from outside. Furthermore, since the tear line 30 is formed on the housing 10, it is possible to prevent a sink mark from being formed in the cover 20 when the cover apparatus is cooled after injection molding. Therefore, it may be easy to manage the quality of the cover apparatus.

Since the tear line 30 is formed on the housing 10, it is possible to prevent the cover 20 from being torn when the airbag is deployed. Therefore, although a structure such as a display unit or an illumination emblem is installed on the cover 20, it is possible to prevent the structure from being damaged when the cover 20 is opened. Thus, a structure such as a display unit or an illumination emblem may be freely installed on the cover 20.

Since the tear line 30 is formed on the housing 10, the airbag is deployed to the outside of the housing 10 as the entire tear line 30 is torn. Therefore, a deployment deviation of the airbag can be prevented from occurring, which makes it possible to improve the deployment performance of the airbag.

The tear line 30 is formed along the circumference of the outer surface of the housing 10. At this time, the tear line 30 is formed at the top of the housing 10. In an embodiment, the tear line 30 may include one or more lines formed along the circumference of the housing 10. The tear line 30 includes a plurality of tear holes 32 arranged in a line along the circumference of the housing 10. The tear holes 32 may be formed at even intervals. Furthermore, the tear line 30 may be formed as a recessed line having a smaller thickness than the housing 10. As the tear line 30 formed at the top of the housing 10 is torn when the airbag is deployed, the cover 20 may be opened from the housing 10.

The cover apparatus of a driver airbag further includes a hinge 40 protruding outward from the housing 10, and connected to the housing 10 and the cover 20 such that the cover 20 is rotated when the cover 20 is opened. Since the cover 20 is rotated about the hinge 40 when the cover 20 is opened, the cover 20 can be prevented from being separated from the housing 10 by the inflation pressure of the airbag. Therefore, it is possible to prevent a driver or passenger from being damaged by the cover 20.

The hinge 40 is formed in parallel to the normal direction of the housing 10. The hinge 40 is inclined toward the top. Since the hinge 40 is formed in parallel to the normal direction of the housing 10, the cover 20 may be easily rotated about the hinge 40 when the cover 20 is opened.

Next, a cover apparatus of a driver airbag in accordance with a second embodiment of the disclosure will be described. Since the second embodiment has substantially the same structure as the first embodiment except a tear band, the same components will be represented by like reference numerals, and the detailed descriptions thereof will be omitted.

Figure 6:
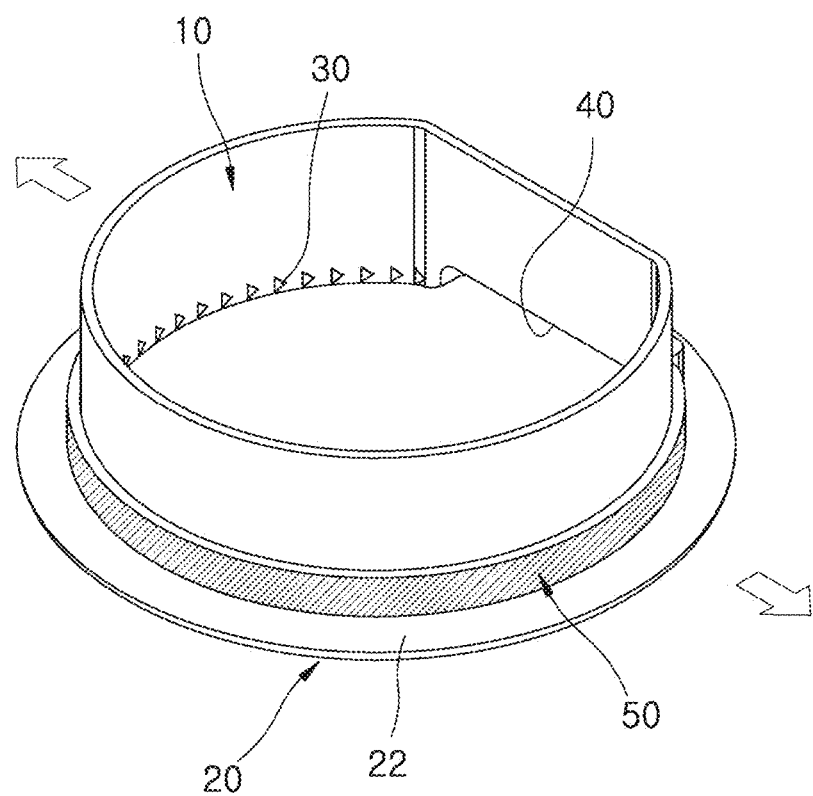
FIG. 6 is a perspective view illustrating the bottom of a cover apparatus of a driver airbag in accordance with a second embodiment of the disclosure.
Figure 7:
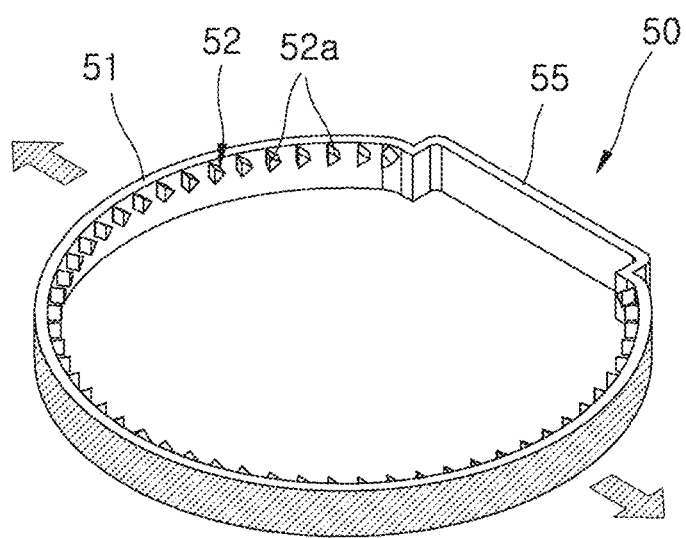
FIG. 7 is a perspective view illustrating a tear band in the cover apparatus of a driver airbag in accordance with the second embodiment of the disclosure.
Figure 8:
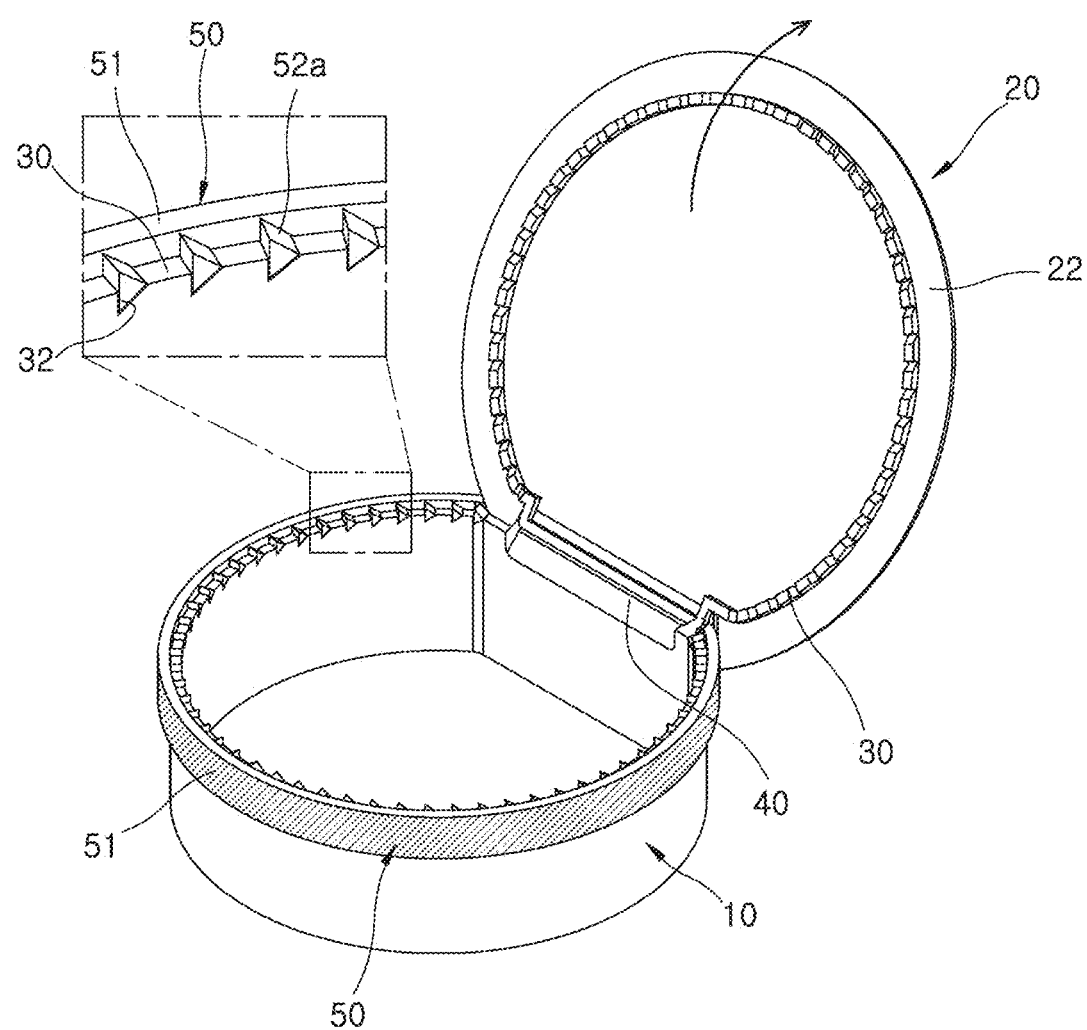
FIG. 8 is a perspective view illustrating that a cover is opened when an airbag is deployed in the cover apparatus of a driver airbag in accordance with the second embodiment of the disclosure.

FIG. 6 is a perspective view illustrating the bottom of a cover apparatus of a driver airbag in accordance with a second embodiment of the disclosure, FIG. 7 is a perspective view illustrating a tear band in the cover apparatus of a driver airbag in accordance with the second embodiment of the disclosure, and FIG. 8 is a perspective view illustrating that a cover is opened when an airbag is deployed in the cover apparatus of a driver airbag in accordance with the second embodiment of the disclosure.

Referring to FIGS. 6 to 8, the cover apparatus of a driver airbag in accordance with the second embodiment of the disclosure further includes a tear band 50 disposed on the outer surface of a housing 10 so as to surround a tear line 30, and having a tear line formation part 52 inserted into the housing 10.

The tear band 50 may be formed in a ring shape. The tear band 50 is formed of a material having a higher melting temperature than the housing 10 and a cover 20. The tear band 50 may be formed of a metallic material or synthetic resin. The cover apparatus may be manufactured through a process of injecting resin into a mold (not illustrated) after the tear band 50 is seated in the mold, and forming the tear band 50 and the housing 10 through insert injection molding.

Since the tear band 50 is disposed on the outer surface of the housing 10 so as to surround the tear line 30, the stiffness of the housing 10 may be reinforced. Thus, deformation of the housing 10 may be reduced when the airbag is deployed.

Since the tear band 50 is disposed on the outer surface of the housing 10 so as to surround the tear line 30, the tear line 30 is shielded from outside by the tear band 50. Therefore, a structure (operating core) inserted into the tear line 30 does not need to be formed in the mold. Thus, the structure of the mold can be simplified to reduce the manufacturing cost. Furthermore, the mold may be easily separated to the outside of the tear band 50.

The tear line 30 is formed on the circumference of the housing 10 except the portion where a hinge 40 is formed. Therefore, although the cover 20 is torn from the housing 10, the hinge 40 can be prevented from being separated form the housing 10 and the cover 20.

Since the tear line 30 is not formed on the cover 20, the structure of a portion corresponding to the cover 20 in the mold can be simplified. Furthermore, since a portion inserted into the cover 20 in the mold is removed, the mold can be easily separated to both sides of the housing 10.

The tear band 50 is disposed at the top of the housing 10 so as to support the cover 20. Since the tear band 50 supports the bottom of the cover 20, the deformation of the cover 20 can be reduced when an external force is applied to the cover 20. That is, when a driver presses the cover 20 so as to operate a horn, the tear holes 32 can be prevented from being deformed. Therefore, it is possible to prevent an occurrence of problem with the quality of the cover apparatus.

The tear line formation part 52 includes a plurality of protrusions 52a arranged along the inner surface of the tear band 50. Since the plurality of protrusions 52a are inserted into the housing 10, the tear holes 32 are formed at the circumference of the housing 10.

The tear line formation part 52 may be a protruding line (not illustrated) formed along the inner surface of the tear band 50. As the protruding line is inserted into the housing 10, a linear tear groove (not illustrated) may be formed along the circumference of the housing 10.

The tear band 50 includes a round band 51 and a linear band 55.

The round band 51 is formed in a round shape to surround the tear line 30, and has the tear line formation part 52 formed on the inner surface thereof. The round band 51 is formed in the shape as the circumference of the housing 10. The linear band 55 is connected to both ends of the round band 51, and disposed outside the hinge 40. The linear band 55 has no tear line 30 formed thereon. Since the round band 51 and the linear band 55 are installed to surround the circumference of the housing 10, the housing 10 can be suppressed from being deformed outward when the airbag is expanded.

Although preferred embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A driver airbag system comprising:
    a housing having an inner storage space and an opening exposing the inner storage space;
    an airbag placed in the inner storage space of the housing; and
    a cover attached to a top portion of the housing and covering the opening of the housing
    wherein the housing comprises a tear line spaced apart from the cover such that the cover and the top portion of the housing attached to the cover are removed to expose the opening of the housing when the airbag is deployed.

2. The driver airbag system of claim 1, wherein the tear line is formed along a circumference of the housing.

3. The driver airbag system of claim 2, wherein the tear line is formed along the top portion of the housing.

4. The driver airbag system of claim 2, further comprising a hinge connected between the housing and the cover.

5. The driver airbag system of claim 4, wherein the hinge is formed in parallel to a normal direction of the housing.

6. The driver airbag system of claim 4, wherein the tear line extend from one end of the hinge to another.

7. A driver airbag system comprising:
    a housing disposed in a mounting plate, and having an airbag installed therein;
    a cover installed over the housing so as to cover a top of the housing;
    a tear line tearably formed on the housing such that the cover is opened when the airbag is deployed; and
    a tear band disposed on an outer circumference of the housing so as to surround the tear line, and having a tear line formation part inserted into the housing.

8. The driver airbag system of claim 7, wherein the tear band is disposed at the top of the housing so as to support the cover.

9. The driver airbag system of claim 7, wherein the tear line formation part comprises a plurality of protrusions arranged along an inner surface of the tear band.

10. The driver airbag system of claim 7, further comprising a hinge connected between the housing and cover,
    wherein the tear band comprises:
        a round band formed in a round shape to surround the tear line, and having the tear line formation part formed on an inner surface thereof; and
        a linear band connected to both ends of the round band, and disposed outside the hinge.

* * * * *